United States Patent [19]

Kendall et al.

[11] 3,735,093

[45] May 22, 1973

[54] STEP MOTOR AND CONTROLS FOR NON-OSCILLATING PUNCH/READ POSITIONING OF 80-COLUMN RECORD CARDS

[75] Inventors: Frank T. Kendall, Poughkeepsie; Donald L. Pierce, Hyde Park; Walter J. Weikel, Wappingers Falls, all of N.Y.

[73] Assignee: International Business Machines Corporation, Armonk, N.Y.

[22] Filed: June 30, 1971

[21] Appl. No.: 158,343

[52] U.S. Cl. .................235/61.1, 234/129, 318/138, 318/594

[51] Int. Cl.......B26f 1/04, G06k 13/07, H02k 37/00

[58] Field of Search .......................235/61.1; 234/20, 234/36, 128, 129; 318/594, 138

[56] References Cited

UNITED STATES PATENTS

| | | | |
|---|---|---|---|
| 3,027,068 | 3/1962 | Iwai et al. | 235/61.1 UX |
| 3,458,786 | 7/1969 | Thompson | 318/594 X |
| 2,749,986 | 6/1956 | Maul | 234/129 X |
| 3,386,018 | 5/1968 | Smith-Vaniz | 318/138 |

*Primary Examiner*—Maynard R. Wilbur
*Assistant Examiner*—Thomas J. Sloyan
*Attorney*—Robert Lieber and Hanifin and Jancin

[57] ABSTRACT

A high precision high speed bidirectional step motor assembly, without gears or commutation, rapidly and precisely positions standard 80 column record cards without oscillation relative to a combined reading, punching and printing station of a card data recorder. Read cells and punch-print elements are separated by 2 units of card column displacement (2 × 0.087 inches). Four step drive excitation for the step motor (three drive pulses and one "hold" or "detent" pulse) is derived from pre-existing recorder circuits associated with buffer storage and logic sections. This permits reading, punching and printing operations to occur in synchronization with buffer and logic operations while card motion is definitely stopped in the holding stage of the motor drive cycle. A pressure roller which engages the card with a feed wheel extension of the step motor is disengaged either manually or by operation of conventional registration mechanisms as the cards are fed to the initial registration position of the combined station (card column "0" under punch and print elements; column 2 under read cells). In read mode the first dummy cycle of step motor excitation backs up the card one column returning column 1 of the card to the read position. The advantage of this is that the read cells can be utilized in a dual mode to detect the leading edges of cards as a condition of the registration operation and to read card apertures. In punching-printing mode the usual first "dummy" cycle of forward stepping is taken.

10 Claims, 7 Drawing Figures

INVENTORS
FRANK T. KENDALL
DONALD L. PIERCE
WALTER J. WEIKEL

BY Robert Lieber

ATTORNEY

STEP MOTOR AND CONTROLS FOR NON-OSCILLATING PUNCH/READ POSITIONING OF 80-COLUMN RECORD CARDS

CROSS-REFERENCES TO RELATED APPLICATIONS

1. Copending patent application Ser. No. 155,449 by J. Lettieri for "Word Backspace Circuit For Key Entry Device" filed June 22, 1971; and 2. Copending patent application Ser. No. 193,899 by R. B. Battistoni et al. for "Verify Read Control" filed Oct. 29, 1971.

SUMMARY OF THE INVENTION

The invention pertains generally to the positioning of record cards in data recorder apparatus for punching, printing and reading operations. Historically this positioning function has been performed by elaborate escape and emitter mechanisms which have been coupled through gearing to the principle drive mechanism governing other basic card transport functions (e.g. feeding, registering and stacking). Such mechanisms must satisfy intensive reliability, serviceability, speed and precision requirements, and are therefore quite expensive to produce and maintain. The mechanically released and detented escapement wheel teeth have critical spacing tolerances and yet they are subject to considerable wear stress; especially when operating at high stepping speeds.

When the recorder apparatus includes electronic storage and logic functions it is desirable in the high speed reading mode to coordinate the mechanical operations of the escape assembly with the buffer and logic timing in order to be able to efficiently transfer card data into the buffer. For this purpose cards are read "on the fly" with precision strobing and latching secured through the operations of the emitter mechanism and associated circuits adapted specifically for this purpose.

The aim of the present invention is to eliminate or offset many of the foregoing problems and difficulties in buffered recorder apparatus. By providing a combined read and punch-print station, together with a non-oscillating electrically driven card positioning unit having no mechanical gears or commutation we eliminate the escape and emitter assemblies at a net reduction in cost. This cost saving together with unexpected operational advantages — including prolonged reliability, ease of service repair and replacement, and simplification of the synchronization controls required for punch/read positioning — are viewed as distinctly synergistic.

In designing a combined punch/read station it was decided that the read station should precede the punch station in relation to the advancing card — specifically by 2 column steps of forward displacement — whereby column 1 of each initially registered card would lie midway between the punch and read stations and column 2 would be situated directly beneath the read cells. Two advantages flow from such an arrangement. The first is that the read cells in addition to normal reading usage can be used also to detect the passage of the leading edge of the card as it is moved into registration. The second is that since punching operations predominate over reading operations in normal overall usage of the recorder apparatus the registered card is immediately in position for advancement to the punches, resulting in overall throughput advantage.

In addition to cost savings, elimination of read strobing and improved reliability and serviceability, the step motor provides the additional advantage that it lends itself more simply than the escape assembly to a two-speed card stepping motion synchronous with basic buffer timing. Thus, the present motor control circuits are easily adapted to provide low speed (intermittent) card stepping during punching (and/or printing) functions and high speed (concatenated) stepping during reading functions and/or plural column skipping punch functions.

The feed wheel attached to the step motor is situated so that its point of tangential engagement with the lower edge of a card is substantially in line with the punch positions of the combined station. Thus when a card is initially registered, with column 1 midway between punch and read positions of the station, enough card gripping surface is available to the feed wheel to permit reverse ("back-up") stepping of the card to initialize its position for reading functions; whereas, at the other extreme of card positioning, enough card gripping surface is available to permit retention of the card following verification operations for a final column (column "81") verification punch.

As previously suggested the foregoing "back-up" control for initial reading operations is coordinated with card registration by detecting passage of a card leading edge under the read cells concurrent with operation of the registration mechanism as condition precedent to initiating reading and/or punching operations. One of the reading cells (e.g. that in the No. 4 punch row position) detects the light transition associated with the passage of the card leading edge and prepares an electronic gating circuit to sense the completion of registration movement of the registering mechanisms. It is only when the correct sequence of edge detection and registration conditions is sensed that the signal is given to initiate card processing (starting with the back-up dummy step for read processing or forward dummy step for punch/print processing).

The step motor itself is a sealed unit having no gears or commutators and not subject to field repair. It is a brushless d.c. motor having four groups of windings energized in selective sequence by four uniquely timed d.c. drive pulses. The sequence of winding selection establishes the step direction (forward-backward). The first three drive pulses are timed to accelerate and deaccelerate the motor smoothly so that the rotational velocity is approaching zero at the end of the third drive pulse interval while at the same time the rotor is approaching the desired final position. The fourth pulse, applied as a holding (detent) pulse in coincidence with the termination of the third pulse, thereby serves to bring the rotor quickly and smoothly to a halt at the final position with minimal oscillation or overshoot. This places minimal stalling torque on the motor while tending to optimize the stepping rate as well as the period stopping of the motor during which the card is subject to reading and/or punching.

The motor consists of a rotor having 50 teeth arranged symmetrically in a circle and a stator having 48 circularly disposed teeth concentric with and closely coupled to the rotor teeth to form magnetic circuit gaps. The stator teeth are arranged, in groups of six teeth, on eight radially disposed poles which carry windings interconnected in pairs on diametrically opposed poles. The interconnected winding pairs are energized consecutively in a selected sequence by the above mentioned drive pulses. An 18 volt d.c. power supply and solid state switch network provide drive energy and winding sequence selection, respectively; the latter for forward and reverse step selection.

The relative timing of the four slewing or drive pulses in each four step drive sequence is fixed but the release of individual sequences can be gated to coincide with randomly occurring card stepping conditions (e.g. key actuations, etc.). The leading edge position of the first drive pulse invariably coincides with a particular phase of the pre-existing 72 microsecond timing ring governing the cycle timing of the buffer. The four drive pulses have respective durations of 1.601, 2.650, 2.272 and 4.997+$x$ milliseconds ($x$=0 or arbitrary inter-step holding interval). Thus the minimum interval between steps is 1.601, + 2.650 + 2.272 + 4.997 = 11.52 milliseconds and card motion is essentially stopped for almost the entire holding phase of 4.997 milliseconds. Thus the card may be read or punched during the final 4.997+$x$ milliseconds and exchanges between the card read and punch latches and the buffer may be effected during the previous or following 6.523 milliseconds of motion. Thus in concatenated read movements the read latches may alternately be filled while the card is stopped in the holding phase and transferred to the buffer during a 72 microsecond fraction of the succeeding motor step interval in which the card is in motion, for optimized process efficiency.

The foregoing and other features, advantages and objectives of the present invention should become apparent from the following specific description thereof.

DETAILED DESCRIPTION

Figures 1, 1A:
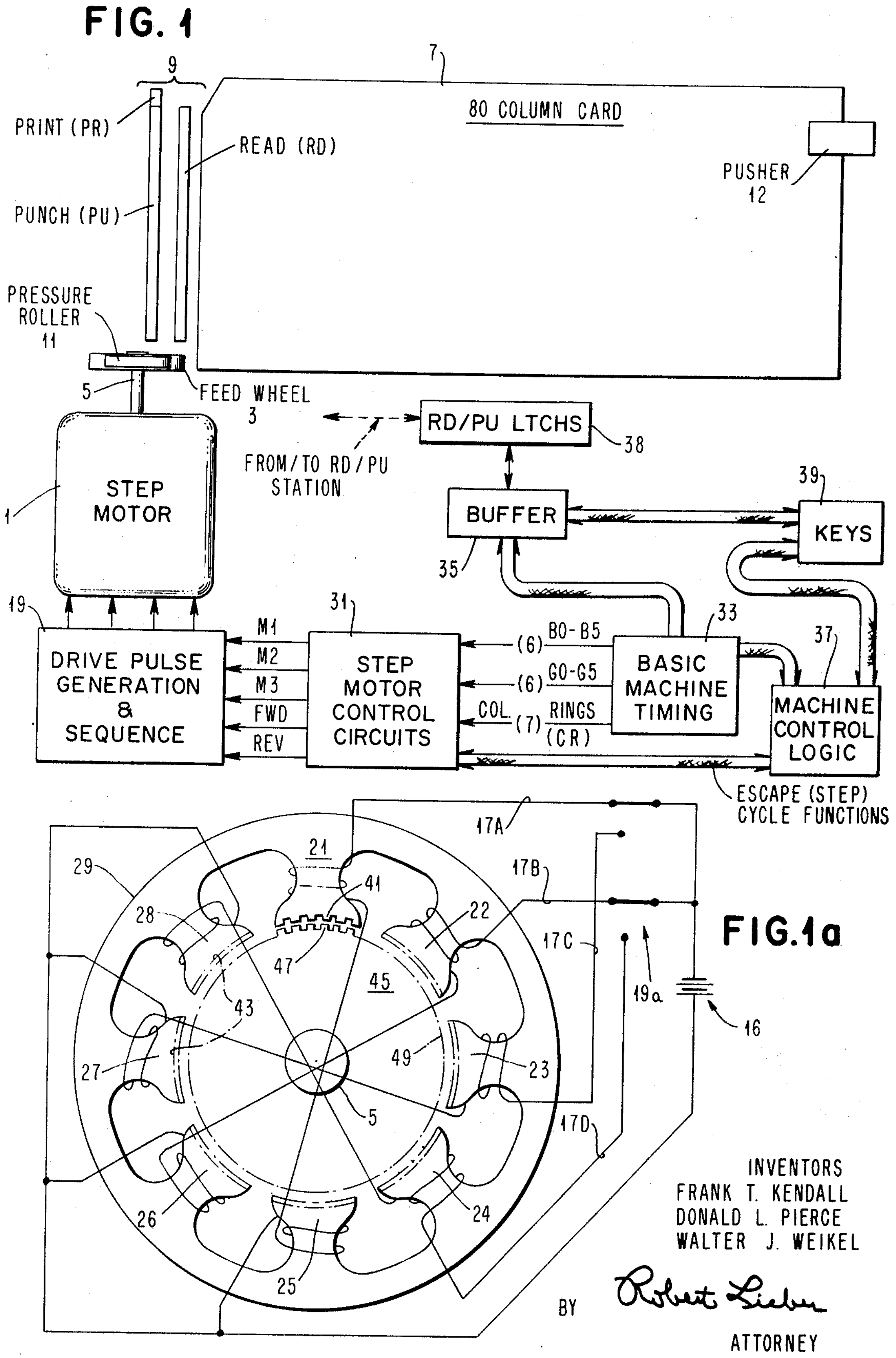
FIG. 1 is a system schematic illustrating dimensional and positional relationships between the card positioning (stepping) assembly and the combined read/punch-print station; and further illustrating electrical connection relationships between buffer, logic, timing and keying circuit elements of the recorder apparatus and the present step motor drive control circuits.
FIG. 1*a* details the step motor internal construction in a schematic plan view.

Referring to the apparatus schematic of FIG. 1 and to the internal step motor construction characterized in FIG. 1*a*, step motor 1 operates through feed wheel 3 attached to its shaft 5 to advance an 80 column record card such as 7 through the combined read and punch/print station 9 in response to d.c. drive pulses described hereinafter. Cards are releasably engaged with the feed wheel by conventional pressure roller 11 which is spring-biased towards the feed wheel by a not-shown spring and displaced away from the feed wheel by the card feeding and registration mechanism of which only the pusher element 12 is shown. The not shown other parts of this mechanism are of well known conventional construction and do not form a part of the present invention.

Power supply 16 (18 volts) and winding circuits 17A–17D supply drive excitation to select combinations of motor stator windings (FIGS. 1*a*, 3*b*) via connecting circuits 19. Circuits 17A–17D are inductively coupled to pole sections 21 through 28 (FIG. 1*a*) of the motor stator unit 29. Circuits 19 receive control signals from circuits 31 designating forward (fwd) and reverse (rev) directions of motor operation and motor drive gating intervals M1, M2, M3. Circuits 31 in turn derive timing and step control from the basic timing circuits 33 associated with cyclic buffer store 35 and machine control logic circuits 37. Keys 39 supply manual escape (step) input via the logic of circuits 37. Read/Punch Latches 38 (Rd/Pu Ltchs) serve as buffers between the Read/Punch station 9 and Buffer store 35.

Each stator pole section (FIG. 1*a*) contains six teeth as suggested at 41 for pole section 21 and implied (for the sake of simplicity) by phantom lines 43 in the other pole sections 22–28. Rotor 45 contains symmetrically arranged peripheral teeth indicated in part at 47 and suggested elsewhere by phantom lines 49. There are exactly 48 teeth in the stator (six teeth per pole section times eight pole sections) and 50 rotor teeth. The spacing between adjacent stator pole sections, which is actually a single tooth space, is exaggerated in the drawing for the sake of clarity.

To displace feed wheel 3 (FIG. 1) through precisely one column step of card movement (0.087 inch) rapidly yet without overshoot (i.e. without oscillation) four consecutively occurring control pulses (M1, M2, M3 and coincidence of not M1, not M2 and not M3) and a direction control signal (fwd or rev) are transferred from circuits 31 to connecting circuits 19. This causes pulses of drive current to be applied to select combinations of circuits 17A–17D each of which includes a pair of windings inductively coupled to respective pairs of diametrically opposite stator poles. The winding circuit combinations are excited in one of two select sequences establishing the direction of the step movement.

Figures 3A, 5:
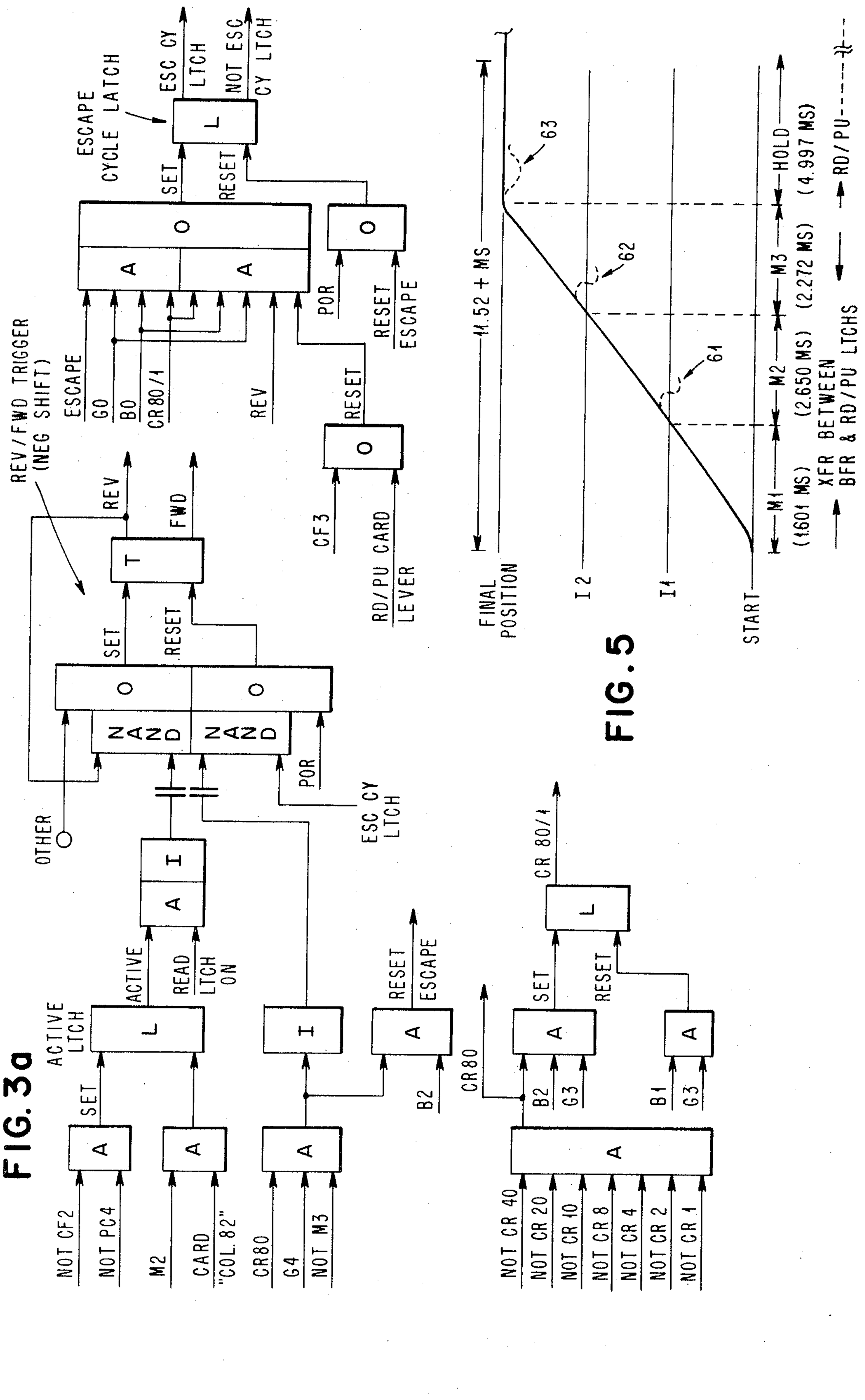
FIGS. 3*a* and 3*b* are circuit schematics illustrating the control and sequence selection circuits for step motor control.
FIG. 5 is a chart characterizing the motion of the step motor during a single step sequence.
Figure 3B:
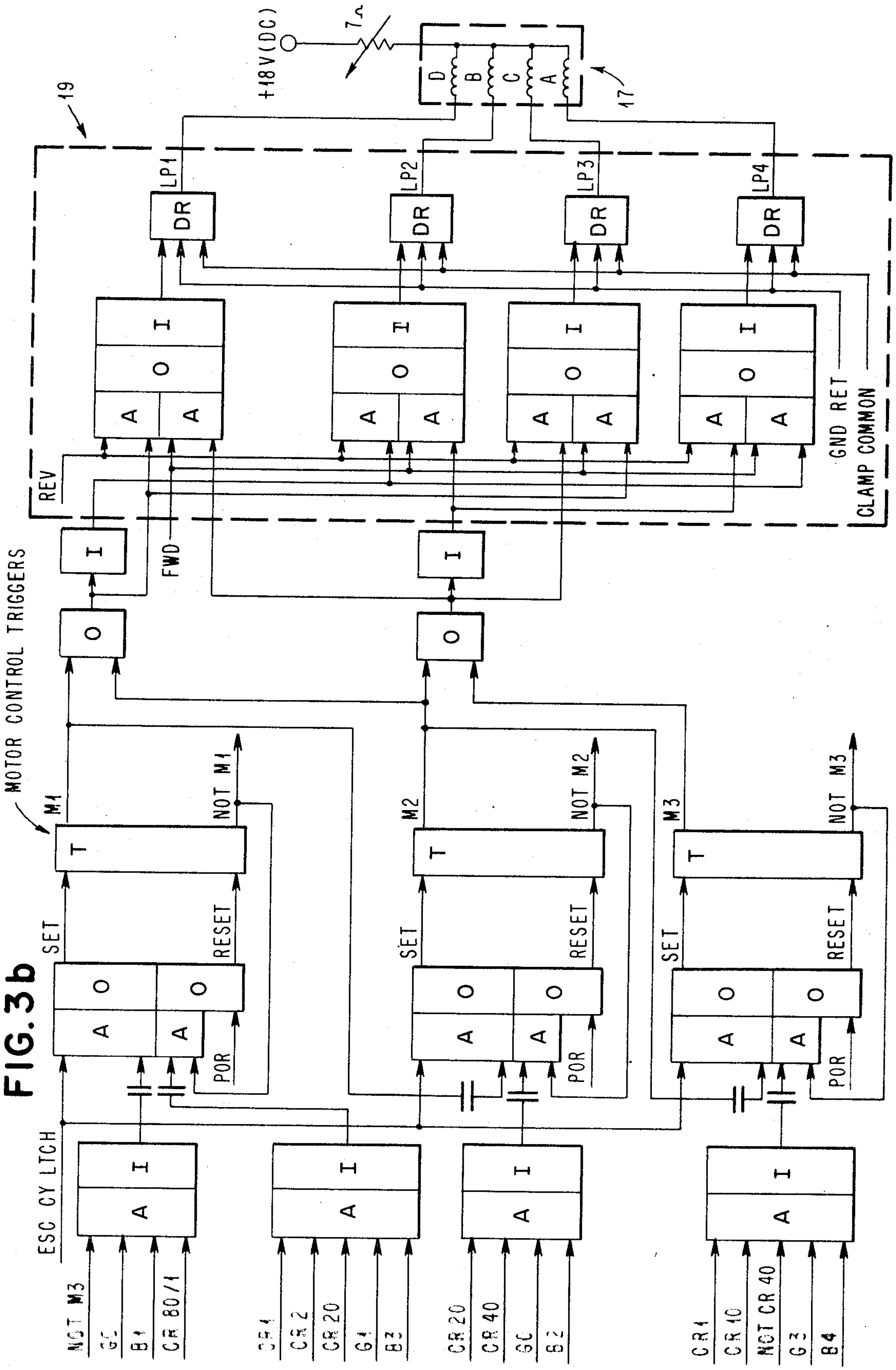

Circuits 19 preferably comprise solid state gating and counting circuits (as indicated in FIG. 3*b*). However, for clarity and ease of explanation they are only suggested in FIG. 1*a* by switch symbols 19*a*. The drive sequences are given by:

| Stage of Motor Operation | Winding Selection Sequence Fwd. | Rev. |
|---|---|---|
| Hold(Not M1,M2 or M3) | 17A, 17B | 17A, 17B |
| M1 | 17B, 17C | 17D, 17A |
| M2 | 17C, 17D | 17C, 17D |
| M3 | 17D, 17A | 17B, 17C |
| Hold | 17A, 17B | 17A, 17B |

The "hold" stage of motor operation, otherwise termed the detent or stopped state, is established by coincident energization of winding circuits 17A and 17B. Forward (counter-clockwise) rotor movement is accomplished in three "driving" stages defined by successive gating pulses M1, M2 and M3. Windings in circuits 17B and 17C are energized during M1, in circuits 17C and 17D during M2, and in circuits 17D and 17A during M3. The fall of M3 starts the detent or hold stage (not M1 and not M2 and not M3) during which circuits 17A and 17B are energized. Reverse stepping is accomplished simply by reversing the selection sequence with certain restrictions discussed later.

As indicated in FIG. 5 during drive stage M1 (1.601 milliseconds) the rotor accelerates towards intermediate positions I1 from its last stopped position (START) around which it would tend to "hunt" or oscillate as suggested at 61 if circuits 17B and 17C were continuously energized. Drive stage M2 (2.650 milliseconds) brings the motor to intermediate position I2, again with tendency to overshoot and oscillate as suggested at 62. Finally drive stage M3 (2.272 milliseconds) carries the motor rotor to the desired final position in a decelerating condition with oscillational tendency as suggested at 63. Since the holding excitation is applied just as the rotor arrives at the final position and begins to reverse direction (i.e. just as it reaches zero angular velocity) the oscillation 63 is virtually completely suppressed and the motor is stopped precisely and with minimal overshoot at the final position.

Step motors having the just-described configuration of 48 tooth stator, 50 tooth rotor, with indicated internal winding circuits are produced and sold commercially, for example by Superior Electric Co. under the trade designation Slo-Syn. It will be understood that the motor as described herein represents a specific element of our inventive combination and is not per se our invention.

FUrthermore, arrangements for four stage slewing of such motors to produce rapid increments of precise step motion, without subjecting the motor to stalling torque or having it hunt or oscillate, are described generally in U.S. Pat. Nos. 3,328,658 and 3,458,786 to L. J. Thompson granted June 27, 1967 and July 29, 1969, respectively and assigned to the assignee of this application. Hence we do not consider four step slewing per se to be our invention. Our invention rather is in the synergistic mating of the particular stepping assembly and controls with a combined punch/read station and pre-existing electronics of card data recorder apparatus.

More particularly, as will become apparent as the description proceeds, the present invention concerns the advantageous substitution of a pulse driven step motor assembly and solid state control circuits, without gearing or commutation, for the conventional electromechanical escape assembly of prior card data recorders and the linking of the step controls to the electronic timing circuits associated with the buffer section of the recorder apparatus for slewed stepping of the motor in plural stages synchronized with the electronic functions of the recorder system. The synergistic effects resulting from this combination include;

1. Simplification of the card processing station through consolidation.

2. Enablement of dual utilization of the read cells for "on-the-fly" card edge detection during card feed and registration cycles preceding read stepping sequences and for card information reading in hold stages of step cycles.

3. simplified and quicker throughput of cards obtained by selective application of forward and reverse drive excitation to the step motor windings in the dummy step cycle immediately following card feed and registration (forward in punch mode; reverse in read mode).

4. Ability in Verify mode, due to arrangement of read and punch station positions, to retain the trailing edge of the card between step motor feed wheel 3 and pressure roller 11 for final column (column "81") proof punching shortly after verification of information in buffer column 80 taken from card column 80; as a corollorary faster completion of verification operations.

5. Simplified access to the card positioning assembly — due to the smaller volume of space occupied by the step motor assembly and its control circuits in comparison to the prior art escape and emitter strobing assemblies — when the present substitution of positioning assemblies is made in a pre-existing recorder frame enclosure.

6. Operation of the step motor in fast, slow or random stepping modes can be accomplished quite simply by concatenating or spacing the motor steps (escape cycles). The slow stepping mode therefor can be conveniently tailored to the operating pace of the punching (and, if provided, printing) mechanisms; and the fast mode can be used for rapid read stepping or for card column skipping operations during punching sequences. Thereby the fast mode timing can be tailored to the "quicker" reaction speeds of the stepping motor assembly and the available timing parameters of the buffer electronics.

Figure 2:
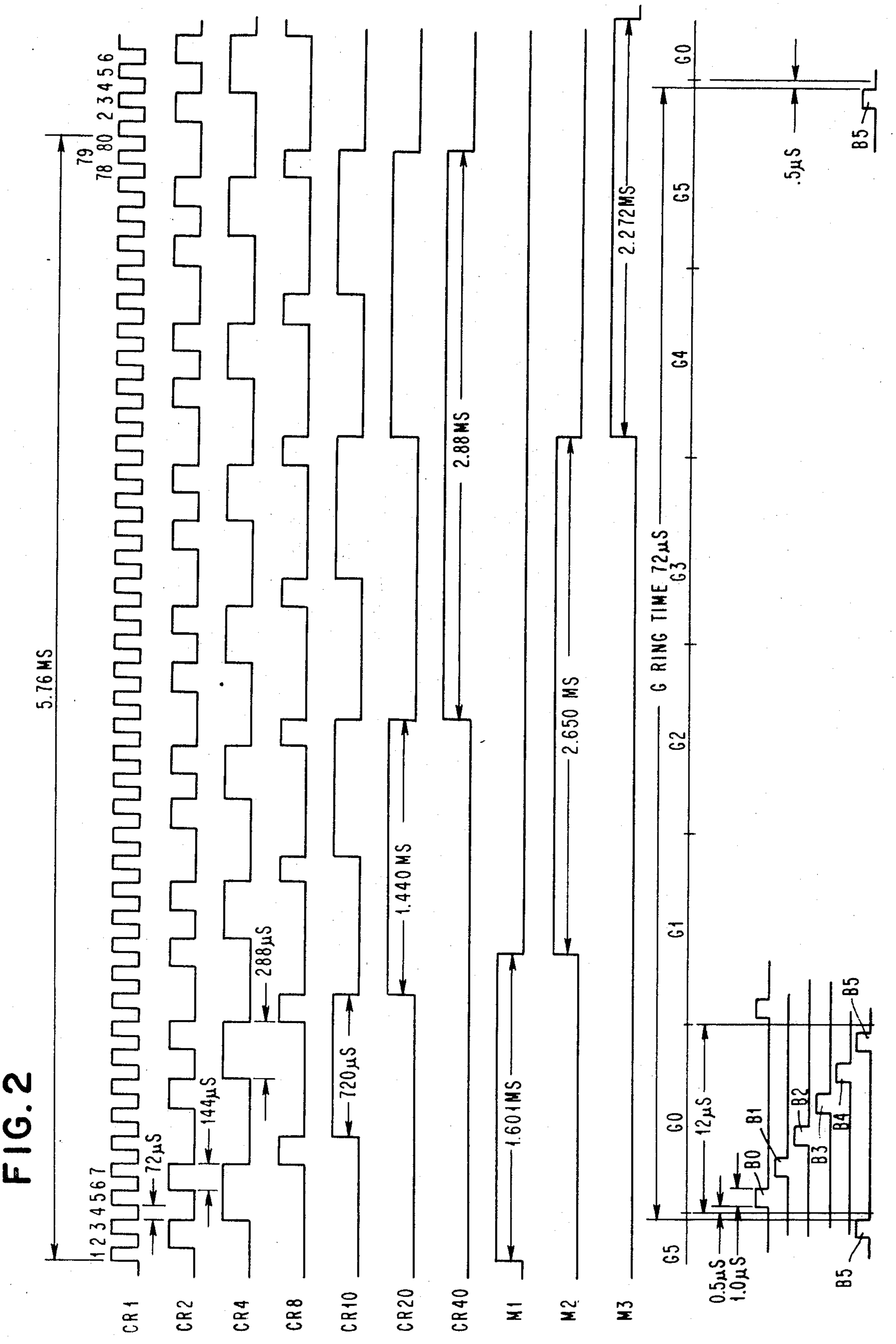
FIG. 2 illustrates comparative timing of basic pulses (rings) provided by pre-existing buffer timing ring circuits and step motor drive pulses M1, M2, M3 (the holding pulse is derived from the coincident non-presence of M1, M2, and M3)
Figure 4:
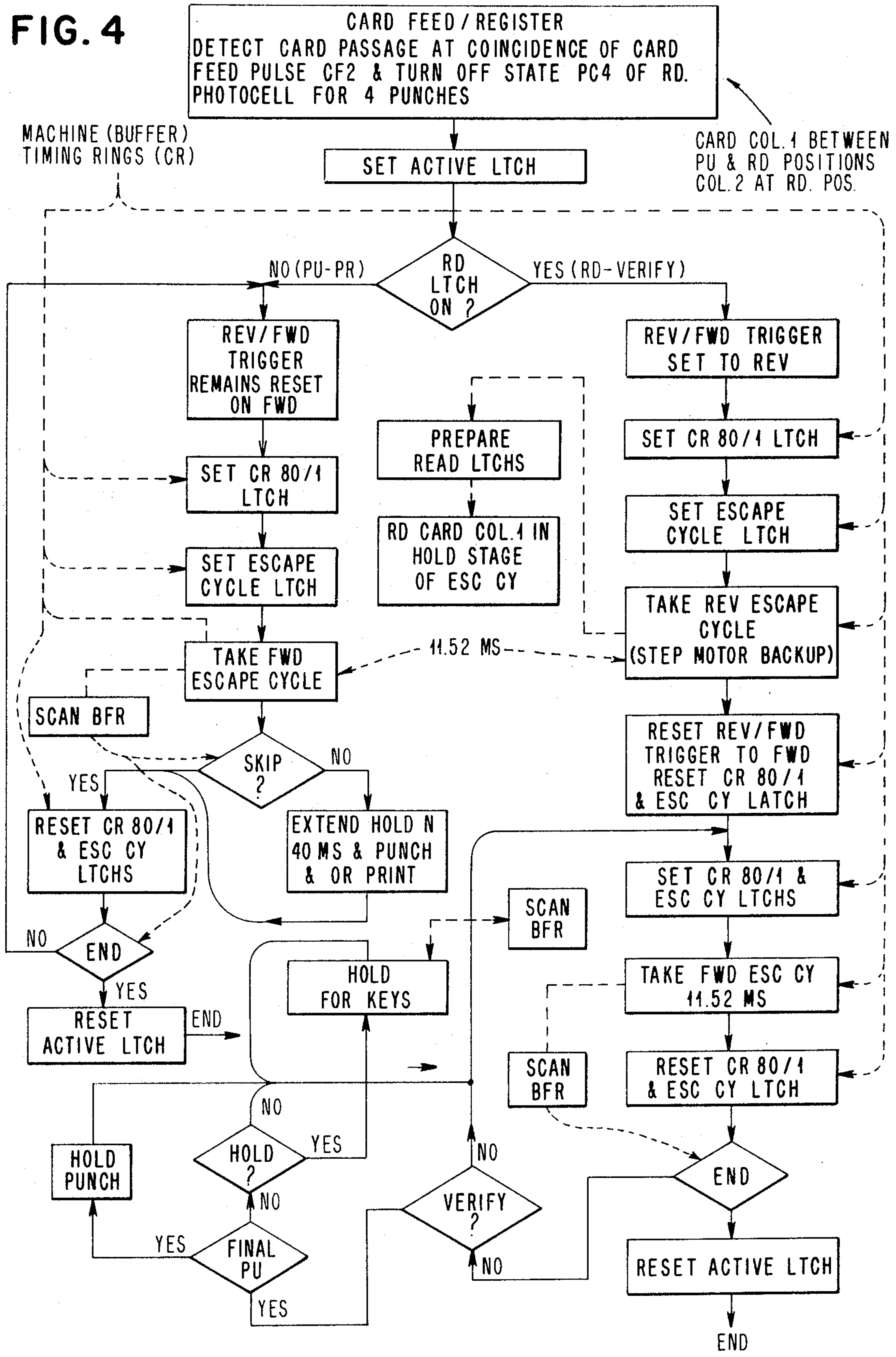
FIG. 4 contains a flow chart of motor stepping operations associated with reading/verifying, punching/printing and punch field skipping.

Before discussing the details of system timing and step motor control as presented in FIGS. 2, 3*a* and 3*b*, it is helpful to consider the general flow sequence of card feeding, registering and read/punch positioning functions as presented in FIG. 4.

Referring to FIG. 4 the processing of a card through the punch-read station 9 involves the following sequence of actions. The card may be fed into the station either manually or under control of the card feed mechanism. If the card is inserted manually a register key must be pressed on the machine keyboard in order to actuate the registration elements of the card feed mechanism. If the card is automatically fed the registration elements will operate automatically.

As the pusher and other registration elements operate forward the card leading edge passes through the read position of the read/punch station. The passage of the as yet unregistered card edge is detected as condition precedent to the execution of further card processing functions. The card edge operates centrally positioned Read Photocell PC4 to the NOT PC4 condition and if card feed cycle timing pulse condition NOT CF2 is raised concurrently the ACTIVE latch is set (see FIG. 3*a* also). The card feed pulse condition is obtained from the basic machine timing and control logic circuits 33 and 37 (see FIG. 1).

At this point a READ latch in the machine control logic is examined establishing selective reversal of Reverse/Forward motor control trigger (REV/FWD) (see also FIG. 3*a*) to the REV state from its normal FWD (reset) condition. Consequently if READ latch is not set when examined REV/FWD trigger remains in FWD condition. Thus the motor controls are prepared to carry out an initial backup step for reading and verifying card operations and an initial forward step for punching and printing sequences.

Following READ latch testing the pusher and other registration elements of the feed mechanism complete the card registration movement and retract to disengaged (idle) position. This locates card column 2 in precise registration with the Read Photocells of the reading and punching station, and card column 1 precisely midway between the reading and punching positions of the station.

With the operation and retraction of registration elements pressure roller 11 (FIG. 1) is alternately translated away from the step motor feed wheel 3, allowing the card leading edge to pass without hindrance over the wheel, and then returned under spring constraint ultimately gripping the card securely and holding it against the feed wheel.

Card positioning (escapement) proceeds as follows. Column ring latch CR80/1 (see FIG. 3*a*), when set by specific microsecond timing conditions derived from the basic machine timing circuits, prepares the setting input logic of ESCAPE CYCLE latch (FIG. 3*a*). The machine logic function ESCAPE and card registration functions CF3 and Rd/Pu CARD LEVER are established only while a registered card is in the station. CF3 is the basic registration time function and Rd/Pu CARD LEVER is applied alternately as a safety measure. Thus, when REV/FWD trigger is set to REV (READ mode) and a registration function line is raised ESCAPE CYCLE LATCH is set at a precisely determined machine (buffer) time phase. Alternately, with FWD latch condition and ESCAPE machine control state, ESCAPE CYCLE latch will be set at the same machine time phase.

ESCAPE CYCLE latch set prepares motor control triggers (FIG. 3*b*) for a cycle of step drive having minimal duration 11.52 milliseconds. Thus, while the escape cycle begins at a very precisely defined microsecond time phase of buffer operation its minimal duration, timed by M1, M2, M3 and the minimal period of coincidence of NOT M1, NOT M2, and NOT M3, spans many buffer cycles (viz approximately 160 buffer cycles).

Upon initial reverse escapement (REV and ESCAPE CYCLE set) card column 1 is positioned in precise registration with the read photocells of the combined reading and punching station. Furthermore, during the moving stages of the initial reverse escapement (M1, M2, M3) the read latches which transfer information from the read photocells to the buffer may be prepared to receive information in card column 1 during a predetermined later time phase of the 4.997 millisecond minimal holding stage, whereby the motor controls will be free to begin a forward escape cycle immediately after the minimal duration holding stage. In this way the read latches may be synchronously loaded from the read station photocells while the card is stopped and unloaded into the buffer as the card is moved.

It is observed that in the escape cycle the signal functions ESCAPE CYCLE latch set and M1, M2, M3 or related signal functions may be transferred to the machine control logic circuits 37 (FIG. 1) and used therein to prepare ESCAPE conditioning for the next escape cycle.

Accordingly, it is understood that in reading operations the initial reverse escape cycle has minimal duration during which the FWD trigger condition is reestablished and latches CR80/1 and ESCAPE CYCLE are both reset. At predetermined times preceding the next escape cycle latches CR80/1 and ESCAPE CYCLE are consecutively set initiating forward escape. The card is then successively advanced in forward column increments and with final processing delivered from the step motor feed wheel to conventional stacking mechanisms associated with the feeding and registering apparatus. In each forward escape cycle of the reading operation CR80/1 and ESCAPE CYCLE latch are set prior to escape and CR80/1 is reset shortly after start of escape while ESCAPE CYCLE latch is reset towards the end of the cycle. While the holding stage of card positioning may be prolonged beyond the minimal 4.997 milliseconds, in the usual automatic reading process wherein it is merely desired to transfer the card information to the buffer the forward escape cycles are all concatenated in time and the card is advanced at maximal speed into the stacking mechanism. Typically, therefore an automatic reading sequence in the present apparatus takes about 1 second (i.e. approximately 11.5 milliseconds per column × 82 columns plus allowance for registration). It will be seen later that even this time may be shortened by using faster step motors.

In a verify operation additional time may be required for the final column (column 81) proof punch, and/or for "hold" conditions specified by buffer flag signals. During forward read escape cycles the buffer 35 is scanned by machine control logic 37 and examined for flags in specific storage columns governing release of the machine ESCAPE function and preparation of final column verification punch and END conditions. At END the ACTIVE latch is reset, and the card passes out of the feed wheel/roller gripper range into the stack position.

Punching and printing cycles generally require more time than reading cycles since the punching and printing mechanisms are inherently slower. Accordingly in punching and/or printing the initially registered card takes its initial (dummy) escape cycle forward quickly placing card column 1 in punching position within 6.523 milliseconds (M1+M2+M3). But then the release of the ESCAPE function is either deferred (for at least 44 milliseconds) to allow time for punch and/or print operation or the card is immediately stepped forward after the minimal holding stage period (4.997MS). The condition for this slow-fast ESCAPE selection is prepared by scanning the buffer for multiple coincident skip flags indicating that punching shall be skipped in at least the present and next column positions of the card. If there is no plural column skip indication in the buffer the holding stage of the escape cycle is lengthened substantially beyond the minimal 4.997 millisecond duration; specifically, by at least 39 milliseconds if punching is required and 44 milliseconds if printing is required in the particular position. If there is a plural skip indication in the buffer the ESCAPE function is operated and maintained for maximal rate escape operation to advance the card rapidly to the column preceding the next punching position. Then the escape rhythm is slowed down to coordinate with the slow interposing, punching (printing) and retraction motions of the punching (printing) mechanisms.

The buffer is also scanned for END preparation and at END condition the ACTIVE latch (FIG. 3*a*) is reset and the card is stacked.

The control circuits and timing for these operations are indicated in FIGS. 2, 3*a* and 3*b*. FIG. 2 indicates the various timing ring signal functions (B0–B5, G0–G5, CR1, CR2, CR4, CR8, CR10, CR20, and CR40) received by the motor control circuits from the machine timing circuits. These timing rings pre-exist in similar form in a number of electronically buffered card data recorder machines having mechanical escape assemblies. FIG. 2 also shows the basic motor control functions M1, M2 and M3. In regard to the column ring functions it should be observed that CR2 and CR4 have unequal on-off phases whereas the other column rings CR1, CR10, CR20 and CR40 have symmetrical phases. The 72 microsecond phase intervals of the shortest duration column ring CR1 are subdivided in time into specific sub-intervals by particular combinational states of the B and G rings. The G ring has six distinct equal duration phases G0–G5 each 12 microseconds in length. The B ring has six consecutive 1 microsecond stages B0–B5 staggered at 2 microsecond intervals within each G ring phase. The rise of B0 occurs precisely one-half microsecond after the rise of G0 and the fall of B5 precedes the fall of G0 by one-half microsecond.

The fall of motor control pulse M1 coincides with the rise of M2, the fall of M2 coincides with the rise of M3 and, although not indicated in FIG. 2, the fall of M3 coincides with the beginning of the holding stage of drive excitation governed by the condition Not M1 and Not M2 and Not M3.

Considering FIGS. 3*a* and 3*b* in relation to the foregoing timing diagram of FIG. 2 and the previously discussed escape sequencing flow chart of FIG. 4 the operation of the motor control circuits and selection of the motor winding circuits may now be appreciated as follows. The principle motor control elements in these figures in the order of their operation are: ACTIVE latch, REV/FWD trigger, CR80/1 latch, ESCAPE CYCLE latch (all in FIG. 3*a*), three Motor Control triggers (FIG. 3*b*) for producing the control functions M1, M2, and M3, and Drive section 19 (FIG. 3*b*) supplying the winding energization logic pulse functions LP1–LP4 to the step motor winding circuits 17(A,B,C,D). Drivers DR in section 19 provide selective switching paths to ground for pairs of the winding circuits 17(A,B,C,D) which are coupled through the indicated low-valued adjustable resistance to the 18 volt d.c. power supply.

The trigger circuits are negative shift type trigger circuits requiring sharply defined negative going inputs to establish reversals. For quick reference symbols and abbreviations employed in FIGS. 3*a* and 3*b* are explained as follows:

CF denotes card feed (not CF2 and CF3 are particular card feed control pulses established in the machine control circuits which are respectively associated with intermediate and terminal stages of card registration);

PC denotes photocell (not PC4 denotes the turned off condition of the read photocell which is utilized to sense the No. 4 punch row position of the cards);

LTCH denotes latch;

POR denotes power on reset, a machine control function established at power turn on;

Rd/Pu CARD LEVER represents a machine control signal function used redundantly with CF3 and derived from operation of a specific action of the registration mechanism as the registration mechanism is retracted during the terminal phase of card registration;

OTHER represents a machine control input for establishing the REV/FWD trigger in the REV condition at times other than the initial escape cycle of read operation; an example of OTHER condition under which reverse stepping might be used would be for reading of a newly punched field before releasing the cared to the stacker mechanism. Since the card is under positive control of the step motor throughout its 80 column range and since registration is preserved in reverse escape the just-punched card can be reverse stepped from the 80th column to the first column for in-line verification reading of its information.

The functions READ LTCH ON and ESCAPE are also received from machine control logic (37, FIG. 1). Although not indicated in FIGS. 3*a* and 3*b* various of the latch and trigger outputs in these figures are coupled back to the machine control logic to provide timing and card positioning references for preparation of various machine control functions; e.g. ESCAPE, BFR SCAN, etc.

The condition for setting ACTIVE latch (FIG. 3*a*) is the coincidence of card feed function Not CF2 and read photocell function Not PC4, the latter established by the passage of the card leading edge into the station. The resetting condition for ACTIVE latch is the concurrence of Motor Control gating function M2 and machine control function CARD "COL. 82"; the latter established by detection of erasure of particular control flags in all storage columns of the buffer denoting completion of all of the required escape cycles and functions for a card and approach of END condition. In other words ACTIVE latch is reset and END is prepared in M2 of the last card stepping cycle.

The REV/FWD latch is set to REV either under condition OTHER or upon concurrence of machine control latch function READ and set state of ACTIVE latch. The same trigger is reset by either the power on condition (POR) or the concurrence of set state in ESCAPE CYCLE latch and motor control and ring timing conditions NOT M3, CR80, and G4. CR80 is derived upon concurrent NOT conditions in all of the basic column ring functions (refer to logic below ACTIVE latch in FIG. 3*a*). Referring to FIG. 2 CR80 rises and persists for one 72 microsecond interval every 80th step of CR1 (i.e. in each 5.76 millisecond interval in FIG. 2 coinciding with the fall of CR40).

Observing that the phase transitions of column ring CR1 coincide with the fall of B5 in pulse interval G5 it may be seen that the setting function of CR80/1 (And of CR80,B2,G3) occurs approximately 40 microseconds after the rise of CR80 and that CR80/1 is reset by B1 G3 some 70 microseconds after it has been set. This means that CR80/1 is set for just under a complete 72 microsecond buffer circulation period.

ESCAPE CYCLE latch set prepares the resetting input logic of REV/FWD trigger. The RESET ESCAPE condition for resetting NOT ESCAPE CYCLE LTCH is derived from the logic associated with the resetting of REV/FWD latch to FWD. As indicated in the drawing RESET ESCAPE is produced by concurrence of CR80, G4, B2 and NOT M3. Therefore it may be seen that RESET ESCAPE has a one microsecond duration (due to the timing of B2) and recurs at intervals of 5.76 milliseconds (due to the timing of CR80) except during motor control stage M3. Thus ESCAPE cycle latch receives one microsecond reset inputs at 5.76 millisecond intervals delineated by B2, G4 except during M3 stage of step motor slewing.

ESCAPE CYCLE LATCH has two logical and setting functions; one prepared by machine control function ESCAPE and the other by concurrence of REV and either CF3 or Rd/Pu CARD LEVER. Both setting functions have the common arguments CR80/1, G0 and B0. Thus it may be seen that when REV is set (e.g. in Read mode card registration feed) the initial reverse escape cycle may be initiated either by the card feed function pulse CF3 or by operation of the read/punch lever signal which as previously noted is a redundant registration indicator.

Since ESCAPE CYCLE latch is set at B0 G0 and receives reset input at 5.76 millisecond intervals not coinciding with, it is seen that ESCAPE CYCLE LTCH remains set for the full 11.52 millisecond minimal duration escape cycle.

In FIG. 3*b* it is seen that the Motor Control trigger setting inputs are prepared in common by ESC. CY. LTCH (ESCAPE CYCLE LTCH), M1 is brought up by And of G0, B1, CR80/1, Not M3 and ESC. CY. LTCH which is generally the timing condition of the system 2 microseconds after the initial rise of ESC. CY. LTCH. Thus, the escape cycle movement controlled by M1 begins at the very precisely defined buffer timing phase G0 B1. As seen in FIG. 3*b* and FIG. 2 fall of M1 is the triggering condition for bringing up M2 and the fall of M2 is the triggering condition for setting M3. The fall of M1 occurs at concurrence of B3,G1,CR1,2,20. Referring to FIG. 2 it is readily appreciated that M1 spans 22 steps of the CR1 ring plus an additional G ring step (12 microseconds) and two B ring steps (4 microseconds). The total elapsed time of M1 is therefore 1.601 milliseconds. Similarly it is seen that the durations of M2 and M3 are established to be 2.650 and 2.272 milliseconds for the particular timing conditions and motor design shown.

The two inverting circuits which receive the logical Or's of M1, M2 and M2, M3 respectively are energized during HOLD (Not M1×Not M2×Not M3) so that the And circuits preceding the drive stages of LP2 and LP4 are prepared irrespective of the REV or FWD condition setting of the REV/FWD trigger. In FWD condition-rise of M1 turns on LP3 and disconnects LP4, rise of M2 picks up LP1 and disconnects LP2, rise of M3 picks up LP4 and disconnects LP3, and fall of M3 reestablishes LP2 and LP4. Referring therefore to the sequence table previously presented it may be seen that LP1 is associated with the winding circuits 17D, LP2 with winding circuits 17B, LP3 with winding circuits 17C and LP4 with winding circuits 17A.

Tracing the winding drive conditions in REV escape mode: Hold state energizes LP4 and LP2 (A,B); M1 controls LP1, LP4 (D,A); M2 controls LP3, LP1 (C,D); M3 controls LP3, LP2 (B,C); and returning to Hold brings up LP4, LP2.

It should be observed that with the indicated logic the FWD/REV trigger may be switched only during the hold stage since it is only in that stage that the FWD and REV branches of the conditioning logic for the LP2 and LP4 drivers (DR) have identical conditioning. Occurrence of a change from FWD to REV in M1, M2 or M3 would cause unscheduled shifting of the drive excitation and positional error. Thus it is seen that in Read mode REV condition (FIG. 3*a*, 4) must be established before setting of ESC. CY. LTCH which prepares the input logic to the motor control triggers; and FWD must not be reset until M3 has dropped. Since "NOT M3" is one of the conditions for the FWD reset it is easily verified that the other ring timing conditions CR80, G4, B2 are not subject to occurrence during stages M1 and M2 of an escape cycle.

Thus, it will be appreciated that by simply providing the simple logic for establishment of the functions CR80 and CR80/1 as indicated together with the preexisting column ring timing functions supplied by the machine buffer timing circuits precise timing control is available for release of escape cycles to the step motor and inhibition of reversal of the state of the direction control trigger during the active driving stages of the escape cycle, without any additional binary counting functions or other logic to support these sophisticated control functions.

We have shown and described above the fundamental novel features of the invention as applied to several preferred embodiments. It will be understood that various omissions, substitutions and changes in form and detail of the invention as described herein may be made by those skilled in the art without departing from the true spirit and scope of the invention. It is the intention therefore to be limited only by the scope of the following claims.

What is claimed is:

1. An arrangement for utilizing a step motor to position a record cards for selective and coordinated coaction with a processing assembly located adjacent a processing path, and with a cyclic electronic buffer store having a scanning period shorter than the time minimally required by said motor to effect a single column stepping movement of said card, comprising:

a card conveying assembly associated with said motor for positioning said card in said path relative to said processing assembly, said conveying assembly comprising a pair of selectively engageable and disengageable rollers having an engagement position tangential to said path for selectively pinching said card to impart movement thereto relative to said processing assembly; said step motor having a rotor member connecting directly with one of said rollers without any gears, clutches or the like, for intermittently moving the card along said path;

means for feeding said card in said path from a source position removed from the pinching range of said rollers into said pinching range while coordinately controlling said rollers to allow said card to move freely into said range with the rollers disengaged and then be pinched by said rollers; and means coupled to the timing controls of said buffer store and coordinated with said conveying assembly for supplying intermittent electrical stepping pulses to said step motor, after engagement of said card by said rollers, in coordination with predetermined phases of operation of said store, thereby permitting intermittent operations of said processing assembly and store relative to said card to be conducted efficiently.

2. An arrangement according to claim 1 in which said step motor is subject to being reversibly driven by said stepping pulses; said processing assembly comprises a card punching assembly and a card reading assembly having centers of coaction spaced apart by a distance equal to two card column increments of displacement; and the center of card pinching engagement of said roller is located in line with the center of coaction of the punching assembly.

3. An arrangement according to claim 2 wherein said feeding means delivers said card to an initial registration position in which its first recording column is situated midway between said centers of coaction.

4. An arrangement according to claim 3 in which said reading and punching assemblies are located successively in the direction of forward stepping movement of said cards along said processing path and including:

edge detection circuit means cooperative with at least one record information sensing element of said reading assembly and with said feeding assembly to detect passage of said card leading edge and portion relative to said reading means during movement of each card into said registration position; and means coupled to said edge detection circuit for controlling initial operation of said pulse supplying means relative to said step motor.

5. An arrangement according to claim 4 wherein said operation controlling means includes forward/reverse control circuit means coupled to said stepping pulse supplying means and reading assembly for selectively conditioning said step motor to effect reverse movement of said card from said initial engagement position for reading operations whereby all columns of the card may be read while the card is held motionless between the time coordinatable intervals of stepping movement of the motor while preventing the benefits of having the reading assembly used for "in movement" leading edge detection and of having the initially engaged card positioned close to the punching assembly.

6. An arrangement according to claim 1 in which:

said step motor contains four discrete winding circuits and is subject to being driven in single angular increments of column displacement rapidly, accurately, without overshoot and without card slippage relative to the rollers, by application of first, second and third successive accelerating pulses of predetermined different durations to respective three of said windings followed immediately by application of a fourth detent holding pulse of indefinite duration to a respective fourth of said windings; and said pulse supplying means includes means for producing said successive accelerating and detent pulses in synchronism with predetermined phases of operation of said buffer store, and means for applying said pulses to said respective motor windings.

7. An arrangement according to claim 6 including an electronic data handling system associated with said store subject to operating independently of said processing assembly with intermittent coupling connection to said assembly, said system having a cyclic electronic time base defined by high frequency clock signals produced by control circuits associated primarily with said system and store; said pulse producing means having ancillary connection to said system control circuits devoted to production of said accelerating and detent pulses.

8. An arrangement according to claim 7 in which the combined durations of said accelerating pulses is less than 7 milliseconds and said detent pulse may have duration as low as 5 milliseconds; whereby said cards may be stepped at a rate in excess of 82 (i.e. greater than 1,000/12) columns per second.

9. An arrangement according to claim 6 in which the assembly coacts with said card at predetermined phase of operation of said store and only while said card is motionless; i.e. only during occurrences of said detent pulses; thereby maintaining reliable communication between said card and processing assembly while coordinately permitting efficient communication between said processing assembly and store.

10. An arrangement according to claim 7 in which said first, second and third accelerating pulses have respective durations of 1.601, 2.650 and 2.272 milliseconds.

* * * * *